Aug. 14, 1951  J. DOLZA ET AL  2,563,822
ENGINE CONTROLLER

Filed April 26, 1944  3 Sheets-Sheet 2

ENGINE INTAKE ALTITUDE PRESSURE—FIG. 1&2
TEMPERATURE—FIG. 4

INVENTORS
John Dolza
Peter W. Peritsky
Donald P. Croisant
Spencer Hardman & Son
ATTORNEYS Aug. 14, 1951  J. DOLZA ET AL  2,563,822
ENGINE CONTROLLER
Filed April 26, 1944  3 Sheets-Sheet 3

ALTITUDE

INVENTORS
John Dolza
Peter W. Petrick
Donald P. Croissant
Spencer Hardman
his ATTORNEYS Patented Aug. 14, 1951

2,563,822

UNITED STATES PATENT OFFICE 2,563,822

ENGINE CONTROLLER

John Dolza, Peter W. Perish, and Donald P. Croisant, Indianapolis, Ind., assignors to General Motors Corporation, Detroit, Mich., a corporation of Delaware Application April 26, 1944, Serial No. 532,800

18 Claims. (Cl. 123—103)

This invention relates to a pressure regulator for the control of intake manifold pressure of a supercharged airplane engine in order to maintain various selected pressures.

An object of the invention is to limit engine intake pressure to a value safe for engine operation when conditions arise which would cause the engine to detonate if the operation of the pressure regulator were unrestricted.

In the case of en engine supercharged by a main supercharger driven directly by the engine and by an auxiliary supercharger driven by means through which the speed of the auxiliary supercharger can be substantially increased when additional pressure boost is required to maintain the selected pressure at high altitudes, the temperature of the air at the outlet of the auxiliary supercharger increases as altitude increases although the temperatures of the outside air decreases. One example of an airplane power plant having main and auxiliary superchargers is that disclosed in the copending application of Dolza et al., Serial No. 520,878, filed February 8, 1944, now Patent No. 2,491,482, issued December 20, 1949. Since the outlet air temperature of the auxiliary supercharger increases as altitude increases because the auxiliary supercharger is caused to run faster in order to maintain pressure, we provide either means which is sensitive to altitude or means which is sensitive to temperature of the intake air or fuel mixture for modifying the action of the pressure regulator in order to limit the intake pressure obtainable to a value such that detonation will not occur although a higher pressure may have been selected.

Pressure selection is obtained through the medium of a datum or pressure selecting cam which is manually operated and a cam follower which is controlled jointly by the cam and by a device responsive to engine manifold pressure. The follower positions the valve of an hydraulic servo-motor which so positions the throttle valve as to correct for any divergencies of manifold pressure from the selected pressure. The follower is permitted to follow the cam so long as pressures are selected which will not cause detonation under engine operating conditions. In the first form of the invention, the means which is sensitive to altitude comprises an aneroid which so positions a stop member engageable by the cam follower as to prevent the latter from following the cam when the cam is moved into a position for selecting a pressure which, if obtained, would cause detonation. In the second form of the invention, the member is actuated by a thermostat sensitive to the air outlet temperature of the auxiliary supercharger.

In the case of an engine having only a supercharger directly driven by the engine, the condition is reversed; that is, as altitude increases, the air temperature at the outlet of the supercharger falls at about the same rate as the temperature of the outside air falls. Therefore, we use a member to limit the control of the cam follower by the datum cam to the extent necessary to protect the engine against detonation at maximum temperature of the air issuing from the supercharger, when the altitude is lowest, and move the limiting member away from the cam follower as altitude increases and as air temperature decreases, so that the pressure selection can be raised and the engine can take advantage of high pressure selections at higher altitudes without danger of detonation.

Further objects and advantages of the present invention will be apparent from the following description, reference being had to the accompanying drawings wherein preferred embodiments of the present invention are clearly shown.

Figure 1:
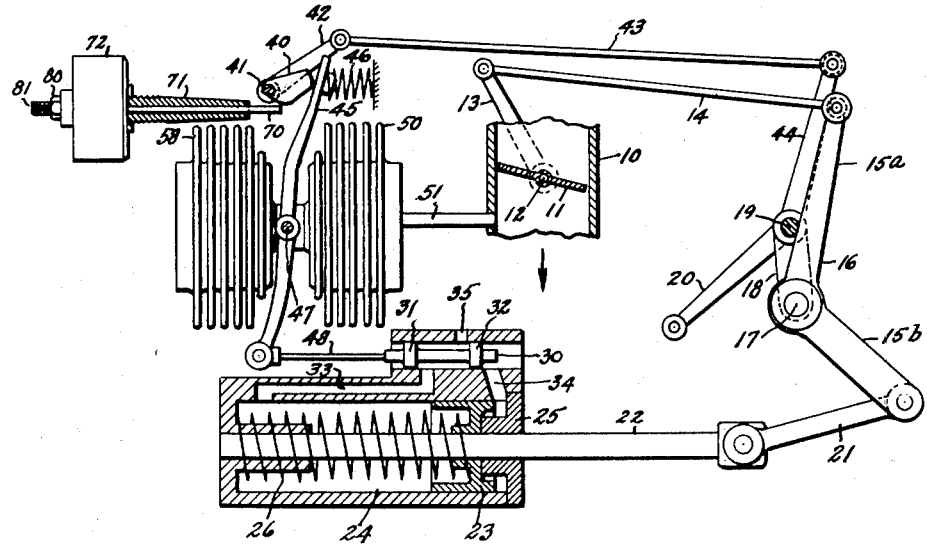
Fig. 1 is a diagram of an embodiment of the invention in which the pressure selection is modified by an aneroid.

Referring to Fig. 1, 10 designates the engine intake air or fuel mixture conduit within which is located a throttle valve 11 mounted on a shaft 12 to which is attached a lever 13 connected by a link 14 with an arm 15a of a bell crank lever 16 which is pivoted at 17 upon a lever 18 attached to a shaft 19 which can be rotated by a manually operated lever 20 known as the main control lever of the regulating device. Lever 20 is connected by means not shown with pilot's throttle lever.

Arm 15b of lever 16 is connected by link 21 with a piston rod 22 of a servomotor having a piston 23 attached to the rod 22 and movable within a cylinder 24 having a head 25 against which the piston 23 is urged by a spring 26. The servomotor is controlled by a valve 30 having lands 31 and 32 which may be located so as to close both ports 33 and 34 connected respectively with the ends of the cylinder 24; or the valve 30 may be positioned as shown connecting fluid pressure inlet port 35 with the port 33 while the port 34 is open for discharge, or the valve 30 may be positioned so that the port 35 is connected with the port 34 while the port 33 is open for a discharge.

The valve 30 is controlled by a mechanism under the control of the main control lever 20. This mechanism includes a pressure selecting cam 40 mounted on a shaft 41, connected with a lever 42 which is connected by a link 43 with a lever 44 attached to the shaft 19 and consequently operated by the lever 20. The location of the cam 40 controls the position of a lever 45 urged by a spring 46 against the cam. Lever 45 is pivoted at 47 and is connected by a link 48 with the valve 30.

Figure 2A:
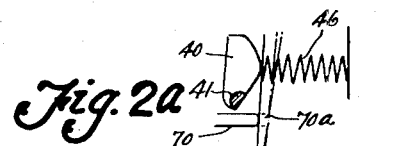
Fig. 2a is a diagrammatic view showing certain parts in different positions.
Figure 2:
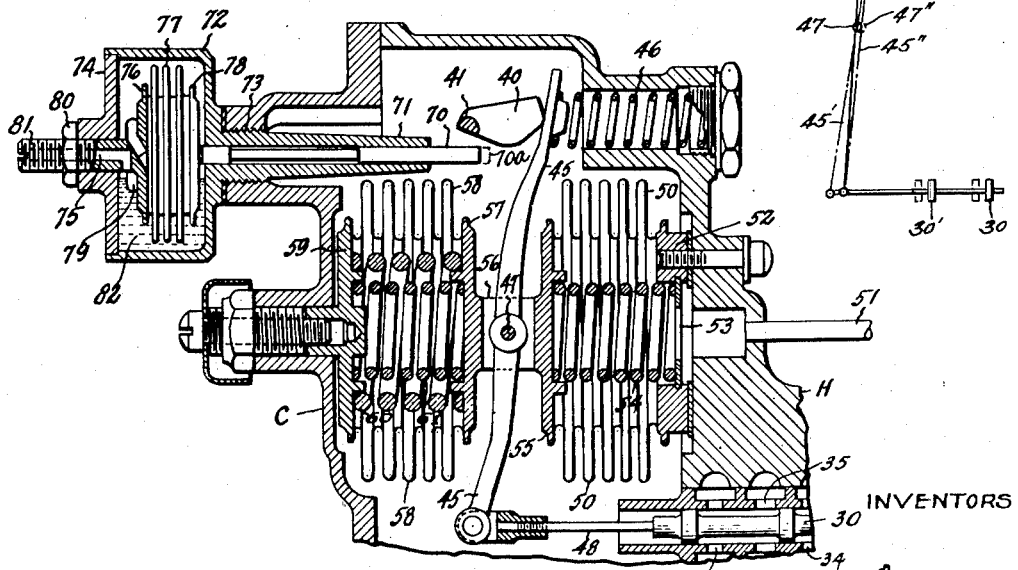
Fig. 2 is a sectional view showing details of the regulating device of Fig. 1.

The mechanism which controls the valve 30 is also under the control of a device responsive to pressure in the engine intake conduit. This device comprises a bellows 50 connected by pipe 51 with the engine intake conduit. As shown in Fig. 2, bellows 50 is connected with a ring 52 attached to the regulator housing H and supporting a washer 53 which receives pressure from spring 54, which presses also against the movable end plate 55 to which the bellows 50 is connected. A bridge 56 which carries the pivot 47 of lever 45 connects the plate 55 with the movable plate 57 forming a closure for a bellows 58 attached to a plate 59 adjustably secured to a housing cover plate C. The bellows 58 which is evacuated contains springs 60 and 61 which are so related to each other and to the spring 54 that the pivot 47 changes its position in a definite relation to changes of pressure within the bellows 50. Since the bellows 50 and 58 have substantially the same area exposed to the atmosphere, the position of pivot 47 is not affected by changes of pressure within housing H.

The cam 40 is so shaped as to determine the position of lever 45 and the valve 30 for all pressure selections. When the selected pressure is greater than the engine intake manifold pressure and, therefore, the pressure within the bellows 50, the valve 30 will be located for connecting the pressure fluid inlet port 35 with the port 34 while the port 33 is open for discharge of pressure fluid within the cylinder 24 and to the left of piston 23. The piston 23 then moves left to effect whatever opening movement of the throttle valve 11 is required to effect an increase in manifold pressure to make it equal to the selected pressure. When the manifold pressure equals the selected pressure, the pivot 47 moves left due to the expansion of bellows 50, thus locating the valve 30 in balanced position, closing both ports 33 and 34. Conversely, when the manifold pressure exceeds the selected pressure, the bellows 50 will have so expanded as to locate the valve 30 so as to connect the ports 35 and 33 while the port 34 is open for discharge. The servomotor piston 23 will then move toward the right to effect whatever closing movement of throttle valve 11 is required to make the intake pressure equal to the selected pressure.

When a certain high pressure is selected for take-off or emergency, the engine may operate without detonation until a certain high altitude is reached. In order to prevent detonation, it is necessary to reduce the pressures to be maintained in the engine manifold. This reduction in pressure is effected without changing the setting of the main lever control 20, by movement of a rod 70, the right end of which is normally in the full line position shown. Fig. 2a shows the cam 40 in a position for selecting a pressure suitable for take-off or maximum power. In response to the attainment of a certain altitude the rod 70 begins moving toward the right and may move as far as the dot-dash line position 70a, so as to move the lever 45 clockwise toward the position 45, the movement depending on the altitude. The valve 30 moves left to cause the servo-motor to close the throttle valve 11. The manifold pressure decreases and bellows 50 contacts to carry the pivot 47 to the position 47'', thereby causing the lever 45 to move to position 45'' and the valve 30 to move into balanced position. In this way the pressure selection is reduced without requiring any movement of lever 20.

The rod 70 is longitudinally slidable in a guide 71 integral with a housing 72, screw threaded at 73 into the cover plate C. The housing 72 carries a cover plate 74 which is threadedly engaged by a tube or stem 81 integral with the fixed end plate 76 of a bellows 77 having a movable end plate 78 for engaging the rod 70. The bellows 77 is evacuated by means of a tube 79 connected with a vacuum pump (not shown), said tube being sealed after evacuation of the bellows and bent around the stem 81 as shown. The bellows 77 is axially adjustable by the stem 81 which can be secured by lock nut 80. The stem 81 is provided with passage 75 for conducting to the interior of the housing 72 a quantity of oil or other liquid 82 suitable for dampening vibrations of the aneroid bellows 77. After the oil has been supplied in chamber 72 the end of the stem 81 may be connected to a conduit leading either to the carburetor intake or the air scoop for the engine, so as to subject the aneroid 77 to the pressure of the entering air.

Figure 3:
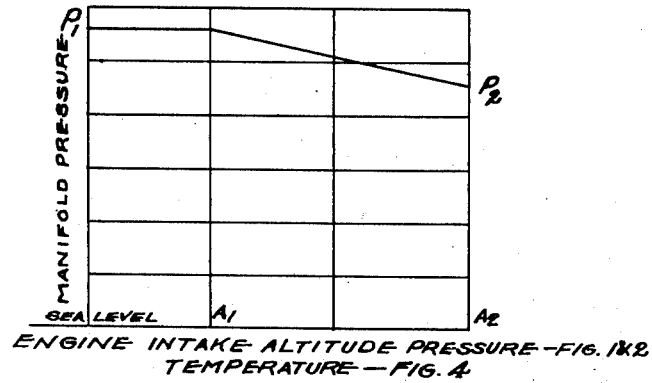
Fig. 3 is a chart showing the mode of operation of the device shown in Figs. 1, 2 and 4.

Fig. 3 shows the operation of the device in Figs. 1 and 2. At sea level a certain manifold pressure P1 has been selected. This pressure is maintained by the regulator until the engine intake altitude pressure becomes the value A1. At value A1 the aneroid 77 begins to move the end of rod 70 toward the right in order to move the lever 45 away from the cam 40. As the engine intake altitude pressure decreases from the value A1, the movement of rod 70 increases to reduce the selected pressure; and, by the time value A2 has been reached, the rod 70 will have been so moved that its end will arrive at location 70a (Fig. 2a), thereby reducing the manifold pressure to value P2. Conversely, as the engine intake altitude pressure increases the aneroid 77 will contract and permit the lever 45 to push the rod 70 toward the left under the action of spring 46 as the lever 45 approaches the cam 40. Therefore, the pressure selection will increase as the engine intake altitude pressure increases.

Figure 5:
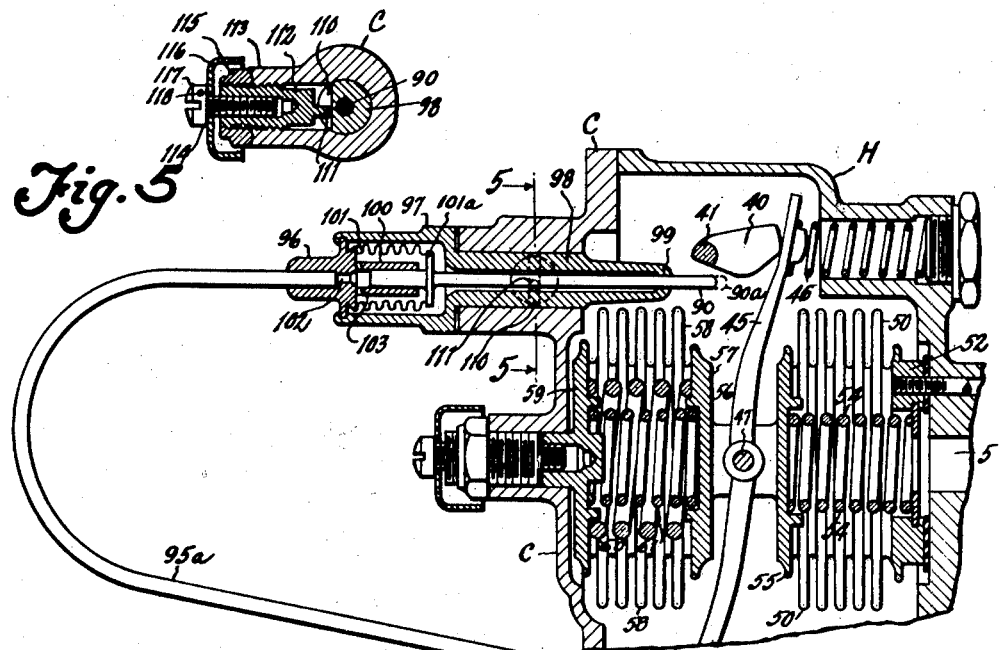
Fig. 5 is a sectional view on line 5—5 of Fig. 4.
Figure 4:
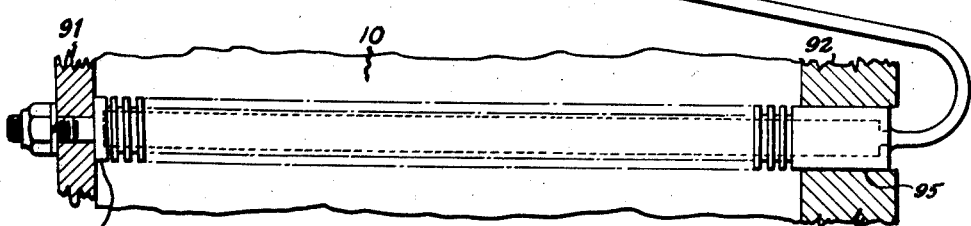
Fig. 4 is a sectional view of a modified form by which the pressure selection is modified by means responsive to temperature of the outlet air of an auxiliary supercharger.
Figure 6:
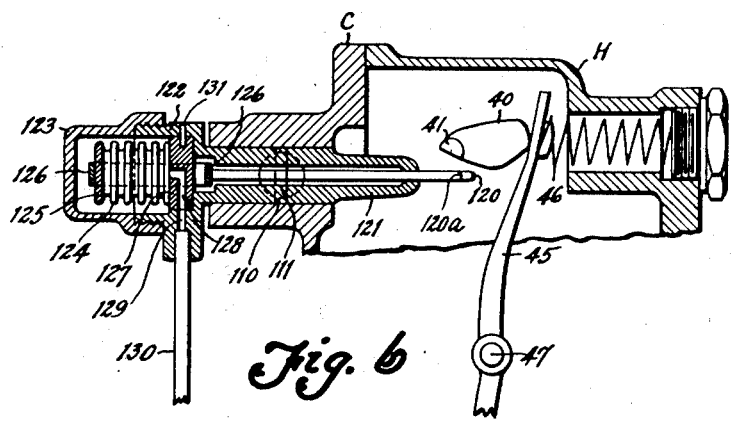
Fig. 6 is a fragmentary sectional view showing another form suitable for an engine having only a directly driven supercharger.
Figure 7:
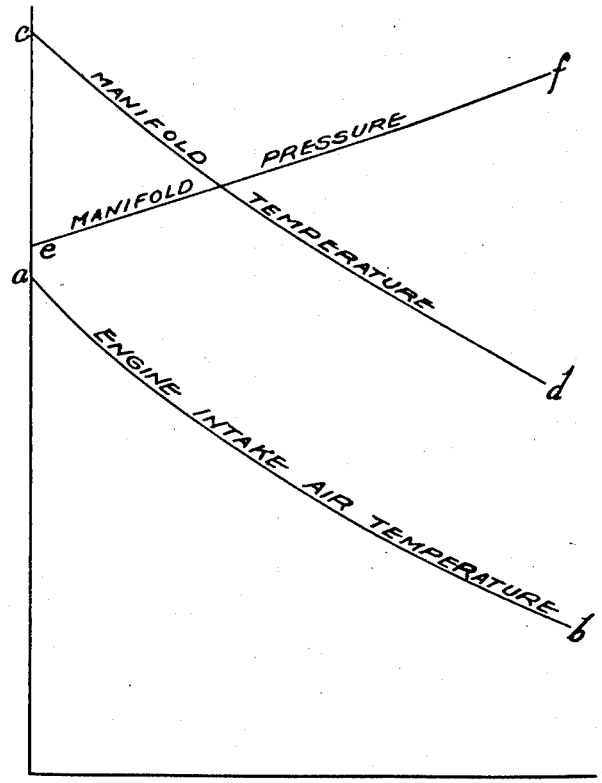
Fig. 7 is a chart showing the operation of the form shown in Fig. 6.

In a second form of the invention shown in Figs. 4 and 5, the lever stopping rod is designated by numeral 90. For an engine intake temperature which would not cause engine detonation for the highest pressure selection the right end of rod 90 stands at the full line position shown. When a temperature is attained which would cause border-line detonation, the rod 90 starts moving toward the position 90a at which it arrives at the maximum temperature of the intake for a particular engine.

The temperature responsive means for moving the rod 90 will now be described. The walls of an intake passage such as the intake passage 10 are indicated by the reference numerals 91 and 92. To the wall 91 there is attached a finned tube 94, the other end of which is slidably mounted in a hole 95 in the wall 92. The tube 94 is connected by pipe 95a with a plug or cover member 96 for a housing 97 having a stem 98 providing a bearing 99 for the right end of rod 90. The left end of the rod 90 is received by tubular bearing 100 carried by the plug 96. To the plug 96 is attached the left end of a metal bellows 101 whose right end is attached to a flange 101a integral with the rod 90. The plug 96 provides passages 102 and 103 connecting the pipe 95 with the interior of the bellows 101. The finned tube 94, the pipe 95 and the bellows 101 and connecting passages are filled with a liquid having such temperature coefficient of expansion that the rod will be caused to move from 90 to 90a in that range of intake temperature which would cause detonation. It will be understood that the element 94 may be positioned at various points along the intake passage as, for instance, at the outlet of an auxiliary supercharger, or elsewhere.

In order to make an adjustment of the position of the right end of rod 90 with respect to the lever 45 and to the cam 40, the housing 97 is axially adjustable with respect to the cover plate C. This adjustment is effected by providing the stem 98 with a groove 110 (Fig. 5) for receiving a pin 111 eccentrically mounted on a screw 112 which is threaded in a tubular boss 113 provided by the cover plate C. When the screw 112 is turned, the pin 111 can be moved to the right or to the left of the position shown in Fig. 4, thereby causing a change in the position of the right end of rod 90. The screw 112 is turned by applying the screw driver blade to slots in its left end, one being shown at 114. The screw 112 is locked in a position of adjustment by a lock nut 115. To prevent tampering with the nut 115 after the adjustment has been made, it is enclosed by cover 116 fastened to the screw 112 by a screw 117 which can be prevented from loosening by means of an anchor wire passing through a hole 118 in the head of a screw. The operation of the form of invention shown in Figs. 4 and 5 is quite similar to the forms shown in Figs. 1 and 2. A certain high pressure may be maintained until a certain intake temperature is reached. As that temperature is exceeded, the pressure is gradually reduced, such reduction in pressure taking place during movement of the right end of the rod 90 from the full line position toward the dot-dash line 90a, as explained with respect to Fig. 2a.

From the foregoing description of two forms of the present invention, it is evident there has been provided means for preventing engine detonation when engine operating conditions arise such as to cause detonation when a high pressure has been selected. If, before a high pressure has been selected, there arises a condition of low engine intake altitude pressure or of high temperature of the air or fuel-mixtures in the engine intake, the fluid-pressure responsive bellows (bellows 77 responsive to engine intake altitude pressure, or bellows 101 responsive to intake temperature) operates to limit the control by the cam 40 to the selection of pressures which will not cause detonation.

As stated heretofore, in the case of an engine supercharged only by a supercharger directly driven by the engine, engine operating conditions are reversed. As altitude increases, the air temperature at the outlet of the supercharger falls at about the same rate as the rate of decrease of outside air temperature. Therefore, the control apparatus shown in Fig. 5 will function in a reverse manner. When the altitude is lowest and the temperature of the air issuing from the supercharger is highest, the member 90 which limits control of cam follower 45 by the datum cam 40 will be located with its right end at 90a in order to protect the engine against detonation by engaging the follower 45 to prevent it from following the cam 40 in case the cam 40 were in a position for selecting a pressure which would cause detonation under these engine operating conditions. As altitude increases and the temperature of outside air and the temperature at supercharger outlet decreases, the end of member 90 moves toward the left from the position 90a, thereby increasing the extent to which the follower 45 is permitted to follow the cam 40 so that the maximum obtainable pressure can be raised and the engine can take advantage of high pressure selections at higher altitude without danger of detonation.

While the embodiments of the present invention as herein disclosed, constitute preferred forms, it is to be understood that other forms might be adopted, all coming within the scope of the claims which follow.

What is claimed is as follows:

1. A pressure regulator for supercharged internal combustion engines comprising a servo-motor, means for connecting it with a throttle valve, in the air or fuel-mixture conduit of the engine, a manually operated member, a device responsive to engine intake pressure, servo-motor control means under control by said member for the purpose of selecting a pressure to be maintained and under control by the pressure responsive device for causing the servo-motor so to operate the throttle valve that a selected pressure is maintained, and means independent of the manually operated member for modifying the action of the servo-motor control means to prevent the maintenance of a high intake pressure when the temperature of the intake air or fuel mixture is reached such that engine detonation occurs with high intake pressure.

2. A pressure regulator for supercharged internal combustion engines comprising a servo-motor, means for connecting the servo-motor with a throttle valve in the air or fuel mixture conduit of the engine, an element for controlling the servo-motor, a manually-operated cam for selecting a pressure to be maintained, a cam follower lever connected with the controlling element, a spring urging the lever against the cam, means responsive to engine intake pressure for controlling the lever, and means for preventing the lever from following high pressure-selecting portions of the cam when conditions arise that would cause engine detonation at high intake pressures.

3. A pressure regulator for supercharged internal combustion engines comprising a servo-motor, means for connecting the servo-motor with a throttle valve in the air or fuel mixture conduit of the engine, an element for controlling the servo-motor, a manually-operated cam for selecting a pressure to be maintained, a cam follower lever connected with the controlling element, a spring urging the lever against the cam, means responsive to engine intake pressure for controlling the lever, and fluid pressure actuated means for preventing the lever from following high pressure-selecting portions of the cam when conditions arise that would cause engine detonation at high intake pressures.

4. A pressure regulator for supercharged internal combustion engines comprising a servo-motor, means for connecting the servo-motor with a throttle valve in the air or fuel mixture conduit of the engine, an element for controlling the servo-motor, a manually-operated cam for selecting a pressure to be maintained, a cam follower lever connected with the controlling element, a spring urging the lever against the cam, means responsive to engine intake pressure for controlling the lever, a stop member in the path of the lever, and altitude responsive means for effecting such movement of the stop that engagement of the lever with the high pressure-selecting portion of the cam is prevented when an altitude is exceeded such that engine detonation would occur at the pressures selected by the cam.

5. A pressure regulator for supercharged internal combustion engines comprising a servo-motor, means for connecting the servo-motor with a throttle valve in the air or fuel mixture conduit of the engine, an element for controlling the servo-motor, a manually-operated cam for selecting a pressure to be maintained, a cam follower lever connected with the controlling element, a spring urging the lever against the cam, means responsive to engine intake pressure for controlling the lever, a stop member in the path of the lever, and means responsive to the temperature of the air or fuel mixture in the engine intake for effecting such movement of the stop that engagement of the lever with the high pressure selecting portions of the cam is prevented when an intake air or fuel mixture temperature is such that engine detonation would occur at the pressure selected by the cam.

6. A pressure regulator for supercharged internal combustion engines comprising a servo-motor, means for connecting the servo-motor with a throttle valve in the air or fuel mixture conduit of the engine, a manually-operated cam for selecting a pressure to be maintained, a device responsive to engine intake pressure, means under the control of the cam and under the control of the pressure responsive device for controlling the servo-motor, and means responsive to altitude change and operating, when an altitude is reached at which engine detonation would occur at the pressure selected by the cam, for preventing control by the cam when in high pressure selecting positions.

7. A pressure regulator for supercharged internal combustion engines comprising a servo-motor, means for connecting the servo-motor with a throttle valve in the air or fuel mixture conduit of the engine, a manually-operated cam for selecting a pressure to be maintained, a device responsive to engine intake pressure, means under the control of the cam and under the control of the pressure responsive device for controlling the servo-motor, and means responsive to attainment of certain high temperatures of the air or fuel mixture in the engine intake such as would cause engine detonation at the pressure selected, for preventing control by the cam when in high pressure-selecting positions.

8. A pressure regulator for supercharged internal combustion engines comprising a throttle valve movable to different positions to regulate the pressure maintained in the fuel induction conduit of said engine, a member movable to different positions to select different pressures to be maintained, automatic means controlled by variations in pressure in the induction pipe and operable to move the throttle so as to maintain any pressure selected by said selector member and means operable automatically and independently of the said selector member for modifying the action of the automatic means when operating conditions are such as would cause detonation so that the pressure maintained by said automatic means will be less than that selected by said selector member.

9. A pressure regulator for supercharged internal combustion engines comprising a throttle valve movable to different positions to regulate the pressure maintained in the fuel induction conduit of said engine, a member movable to different positions to select different pressures to be maintained, automatic means controlled by variations in pressure in the induction pipe and operable to move the throttle so as to maintain any pressure selected by said selector member and automatic mechanism independent of the said selector member for modifying the action of the automatic means, when operating conditions are such as would cause detonation if pressures above a certain maximum are maintained, to prevent the maintenance of pressures above such maximum regardless of the pressure selected.

10. A pressure regulator for supercharged internal combustion engines comprising a throttle valve movable to different positions to regulate the pressure maintained in the fuel induction conduit of said engine, a selector member movable to different positions to select different pressures to be maintained, automatic means controlled by the position of said selector member and variations in pressure in the induction pipe and operable to move the throttle so as to maintain any pressure selected by said selector member and automatic mechanism when operations are such that the selected pressure would cause detonation and operable, without changing the position of the selector member, to modify the action of said automatic means, so as to cause the pressure maintained under such conditions to be less than that selected by said selector member.

11. Apparatus for controlling the intake pressure of a supercharged internal combustion engine comprising a member for actuating a throttle valve in the engine induction passage, a servomotor for operating said member, a device responsive to altitude pressure, an element responsive to engine intake pressure, a manually operable part, pressure selecting means operated by said part, means controlled by said device for modifying the action of the pressure selecting means so as to limit the obtainable pressure to a value less than can be demanded by manual operation, and means under control by said element and by said pressure selecting means for controlling the servomotor.

12. Apparatus for controlling the intake pressure of a supercharged internal combustion engine comprising a member for actuating a throttle valve in the engine induction passage, a servomotor for operating said member, a manually adjusted pressure selecting cam, a cam follower engageable with the cam, an element responsive to engine intake pressure, means under joint control by the element and the cam follower for controlling the servomotor, a stop for limiting the extent to which the cam follower can follow the cam, and a device responsive to altitude pressure for positioning the stop.

13. Apparatus for controlling the intake pressure of a supercharged internal combustion engine comprising a member for actuating a throttle valve in the engine induction passage, a servomotor for operating said member, a device responsive to temperature of engine operating medium, a manually positioned part, pressure selecting means under control by said device and part, an element responsive to engine intake pressure and means under control by the pressure selecting means and by the element for controlling the servomotor.

14. Apparatus for controlling the intake pressure of a supercharged internal combustion engine comprising a member for actuating a throttle valve in the engine induction passage, a servomotor for operating said member, a device responsive to temperature of engine operating medium, an element responsive to engine intake pressure, a manually operable part, pressure selecting means operated by said part, means controlled by said device for modifying the action of the pressure selecting means so as to limit the obtainable pressure to a value less than can be demanded by manual operation, and means under control by said element and by said pressure selecting means for controlling the servomotor.

15. Apparatus for controlling the intake pressure of a supercharged internal combustion engine comprising a member for actuating a throttle valve in the engine induction passage, a servomotor for operating said member, a manually adjusted pressure selecting cam, a cam follower engageable with the cam, an element responsive to engine intake pressure, means under joint control by the element and the cam follower for controlling the servomotor, a stop for limiting the extent to which the cam follower can follow the cam, and a device responsive to temperature of engine operating medium for positioning the stop.

16. Apparatus for controlling the pressure in the fuel mixture intake conduit of a supercharged aircraft engine comprising a throttle valve in said conduit movable to different positions to control the pressure therein, a servomotor operatively connected to the throttle so as to move said valve when the servomotor is operated, a manually operable pressure selecting member movable to different positions to select varying pressures up to a predetermined maximum, a pressure responsive device, a servomotor control means the position of which is determined by said pressure selecting member and said pressure responsive means and effective to cause the servomotor to move the throttle to a position to obtain whatever pressure is selected and to automatically maintain such pressure during operation of the aircraft and means independent of the pressure selecting member and automatically operable under operating conditions which would cause detonation at a selected pressure to limit the movement of the servomotor control means so as to prevent sufficient opening of the throttle by said servomotor to obtain a pressure as great as said selected pressure in order to prevent detonation when a pressure high enough to cause detonation under said operating conditions is selected by said selector member.

17. Apparatus for controlling the pressure in the fuel mixture intake conduit of a supercharged aircraft engine comprising a throttle valve in said conduit movable to different positions to control the pressure therein, a servomotor operatively connected to the throttle so as to move said valve when the servomotor is operated, a manually operable pressure selecting member movable to different positions to select varying pressures up to a predetermined maximum, a pressure responsive device, a servomotor control means the position of which is determined by said pressure selecting member and said pressure responsive means and effective to cause the servomotor to move the throttle to a position to obtain whatever pressure is selected and to automatically maintain such pressure during operation of the aircraft and means independent of the pressure selecting member and operable in response to variations in temperature in the fuel mixture intake conduit for limiting the movement of the servomotor control means so as to prevent sufficient opening of the throttle to cause detonation at any particular intake temperature even if the pressure selecting member is positioned so as to select a high enough pressure to cause detonation at such particular temperature.

18. Apparatus for controlling the pressure in the fuel mixture intake conduit of a supercharged aircraft engine comprising a throttle valve in said conduit movable to different positions to control the pressure therein, a servomotor operatively connected to the throttle so as to move said valve when the servomotor is operated, a manually operable pressure selecting cam movable to different positions to select varying pressures up to a predetermined maximum, a pressure responsive device, a servomotor control member engaging said cam and operable in response to movements thereof and by said pressure responsive device, said member being effective to cause the servomotor to move the throttle to a position to obtain whatever pressure is selected by the cam and means independent of the cam and operable automatically under such operating conditions as would cause detonation at a selected pressure to limit the movement of the servomotor control means so as to prevent sufficient opening of the throttle by said servomotor to obtain a pressure as great as said selected pressure in order to prevent detonation when the cam is positioned to select a pressure great enough to cause detonation under said operating conditions.

JOHN DOLZA.
PETER W. PERISH.
DONALD P. CROISANT.

REFERENCES CITED

The following references are of record in the file of this patent:

UNITED STATES PATENTS

| Number | Name | Date |
|---|---|---|
| 1,711,249 | Prosser | Apr. 30, 1929 |
| 1,983,225 | Gregg | Dec. 4, 1934 |
| 2,088,954 | Gregg | Aug. 3, 1937 |
| 2,217,364 | Halford et al. | Oct. 8, 1940 |
| 2,355,759 | Stokes | Aug. 15, 1944 |
| 2,383,563 | Pugh et al. | Aug. 28, 1945 |
| 2,403,398 | Reggio | July 2, 1946 |

FOREIGN PATENTS

| Number | Country | Date |
|---|---|---|
| 458,350 | Great Britain | Dec. 17, 1936 |
| 499,395 | Great Britain | Jan. 20, 1939 |
| 537,026 | Great Britain | June 5, 1941 |